(12) United States Patent
Priore

(10) Patent No.: US 11,002,603 B2
(45) Date of Patent: May 11, 2021

(54) INTERLACED DIFFRACTIVE GRATING

(71) Applicant: Thorlabs, Inc., Newton, NJ (US)

(72) Inventor: Ryan Joseph Priore, Wexford, PA (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 16/774,318

(22) Filed: Jan. 28, 2020

(65) Prior Publication Data

US 2020/0240842 A1 Jul. 30, 2020

Related U.S. Application Data

(60) Provisional application No. 62/797,842, filed on Jan. 28, 2019.

(51) Int. Cl.
*G01J 3/18* (2006.01)

(52) U.S. Cl.
CPC ......... *G01J 3/18* (2013.01); *G01J 2003/1814* (2013.01); *G01J 2003/1847* (2013.01); *G01J 2003/1861* (2013.01)

(58) Field of Classification Search
CPC ........................................... G01J 3/18
USPC ........................................... 356/328
See application file for complete search history.

(56) References Cited

U.S. PATENT DOCUMENTS

| | | | |
|---|---|---|---|
| 4,886,341 A | 12/1989 | Oishi et al. | |
| 5,608,521 A | 3/1997 | De Long | |
| 5,905,571 A | 5/1999 | Butler et al. | |
| 6,166,373 A * | 12/2000 | Mao | G01C 11/025 250/226 |
| 6,495,818 B1 * | 12/2002 | Mao | G01C 11/025 250/226 |
| 6,587,575 B1 * | 7/2003 | Windham | G01N 33/12 382/110 |
| 2009/0128802 A1 | 5/2009 | Treado et al. | |
| 2018/0354066 A1 * | 12/2018 | Singh | B23K 26/0624 |

FOREIGN PATENT DOCUMENTS

WO 92/22793 A1 12/1992

OTHER PUBLICATIONS

International Search Report issued for corresponding International Patent Application No. PCT/US 2020/015352, dated Apr. 16, 2020.
Written Opinion issued by the International Searching Authority for corresponding International Patent Application PCT/US 2020/015352, dated Apr. 20, 2020.

* cited by examiner

*Primary Examiner* — Tarifur R Chowdhury
*Assistant Examiner* — Omar H Nixon
(74) *Attorney, Agent, or Firm* — Myers Wolin, LLC

(57) ABSTRACT

An interlaced diffraction grating system and process are disclosed. The interlaced grating system includes an optical dispersive grating with alternating bands of unique grating densities wherein the number of unique grating densities is greater than or equal to two. The optical dispersive grating may be reflective or transmissive, and it may be fabricated by mechanical ruling, holography, or reactive ion etching of a binary mask. An interlaced grating allows additional utility for both point spectroscopic detection as well as hyperspectral imaging.

2 Claims, 5 Drawing Sheets

INTERLACED DIFFRACTIVE GRATING

CROSS REFERENCES TO RELATED APPLICATIONS

This application claims the benefit of U.S. Provisional Patent Application No. 62/797,842 filed on Jan. 28, 2019. The disclosure and entire teachings of U.S. Provisional Patent Application 62/797,842 are hereby incorporated by reference.

FIELD OF THE INVENTION

The present application is directed toward the field of diffractive optics and spectroscopic imaging. More particularly, the invention relates to a multifunction diffraction grating for both point detection and spectroscopic imaging.

BACKGROUND

An optical diffraction grating is an optical component with a periodic structure that splits incoming optical radiation (or light) into discrete wavelengths (or colors) as a function of angle. An optical diffraction grating enables a monochromator to yield a multitude of discrete colors of light from a broadband light source or target scene. An optical diffraction grating enables a spectrometer to quantify the intensity of a multitude of discrete colors of light from a broadband light source or target scene. The grating equation relates the grating spacing and the angular distribution of diffracted light, $\lambda$:

$$d(\sin\theta_i - \sin\theta_m) = m\lambda \quad \text{(Equation 1)}$$

and thus $$\sin\theta_i - \sin\theta_m = \frac{m\lambda}{d},$$

where d is the grating spacing, $\theta_i$ is the incident angle of optical radiation, $\theta_m$ is the diffracted angle maxima, and m is the diffraction order.

Gratings are optimized for a diffracted angular distribution, wavelength range, and ultimately resolving power for spectrometers and monochromators. In order to modify such factors, a diffraction grating with a different grating density (or grating period) may be inserted into the spectrometer or monochromator by means of physical replacement or mechanical switching as part of a turret. So, the measurement flexibility of the system usually requires the system to be recalibrated once the grating has been physically replaced or mechanically switched. Other components within the optical system such as lenses, slits, and single channel (or multichannel) detectors contribute to the final system resolution and spectral range. For more complicated optical system such as line-scan (or push-broom) hyperspectral imagers, the spectral range of measurement is fixed. Known systems and processes do not adequately addresses such issues.

Therefore, a multifunctional diffraction grating that shows one or more improvements in comparison to the prior art would be desirable in the art.

SUMMARY

In an embodiment, an interlaced optical grating includes alternating bands of at least a first grating band and a second grating band; wherein the at least first and second grating bands have unique grating densities.

The interlaced optical grating may be reflective or transmissive, and it may be fabricated by mechanical ruling, holography, or reactive ion etching of a binary mask.

In another embodiment, a line-scan hyperspectral imaging system includes: a first lens; a slit; a collimating lens; an interlaced optical grating; a second lens; and a 2-dimensional detector array; wherein the first lens is configured to collect light from a scene and focus onto the slit, the collimating lens is configured to collimate the light from the slit onto the interlaced optical grating, and the second lens is configured to focus the light dispersed by the interlaced optical grating onto the 2-dimensional detector array; wherein the interlaced optical grating comprises alternating bands of at least a first grating band and second grating band, and the at least first and second grating bands have unique grating densities.

In another embodiment, a point detection spectrometer system includes: a first lens; a slit; a collimating lens; a variable optical grating; a second lens; a linear detector array; and a translation stage; wherein the first lens is configured to collect light from a scene and focus onto the slit, the collimating lens is configured to collimate the light from the slit onto the variable optical grating, and the second lens is configured to focus the light dispersed by the variable optical grating onto the linear detector array; wherein the variable optical grating comprises at least a first and second grating regions, and the at least first and second grating regions have unique grating densities; wherein the translation stage is configured to move the first or second grating region into an optical path between the collimating lens and the second lens.

In another embodiment, a method of performing a hyperspectral imaging includes: focusing, by a first lens, light from a scene onto a slit; collimating, by a collimating lens, light from the slit onto an interlaced grating; focusing, by a second lens, light dispersed by the interlaced grating onto a 2-dimensional detector array; wherein the interlaced grating comprises alternating bands of at least a first grating band and second grating band, and the at least first and second grating bands have unique grating densities.

In another embodiment, a method of performing a spectrometer measurement includes: moving, by a translation stage, a selected region of a variable optical grating into an optical path between a collimating lens and a second lens; focusing, by a first lens, light from a scene onto a slit; collimating, by the collimating lens, light from the slit onto the selected region of the variable optical grating; focusing, by a second lens, light dispersed by the variable optical grating onto a linear detector array; wherein the variable optical grating comprises at least a first and second grating regions, and the at least first and second grating regions have unique grating densities.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE PREFERRED EMBODIMENTS

Figures 1A, 1B:
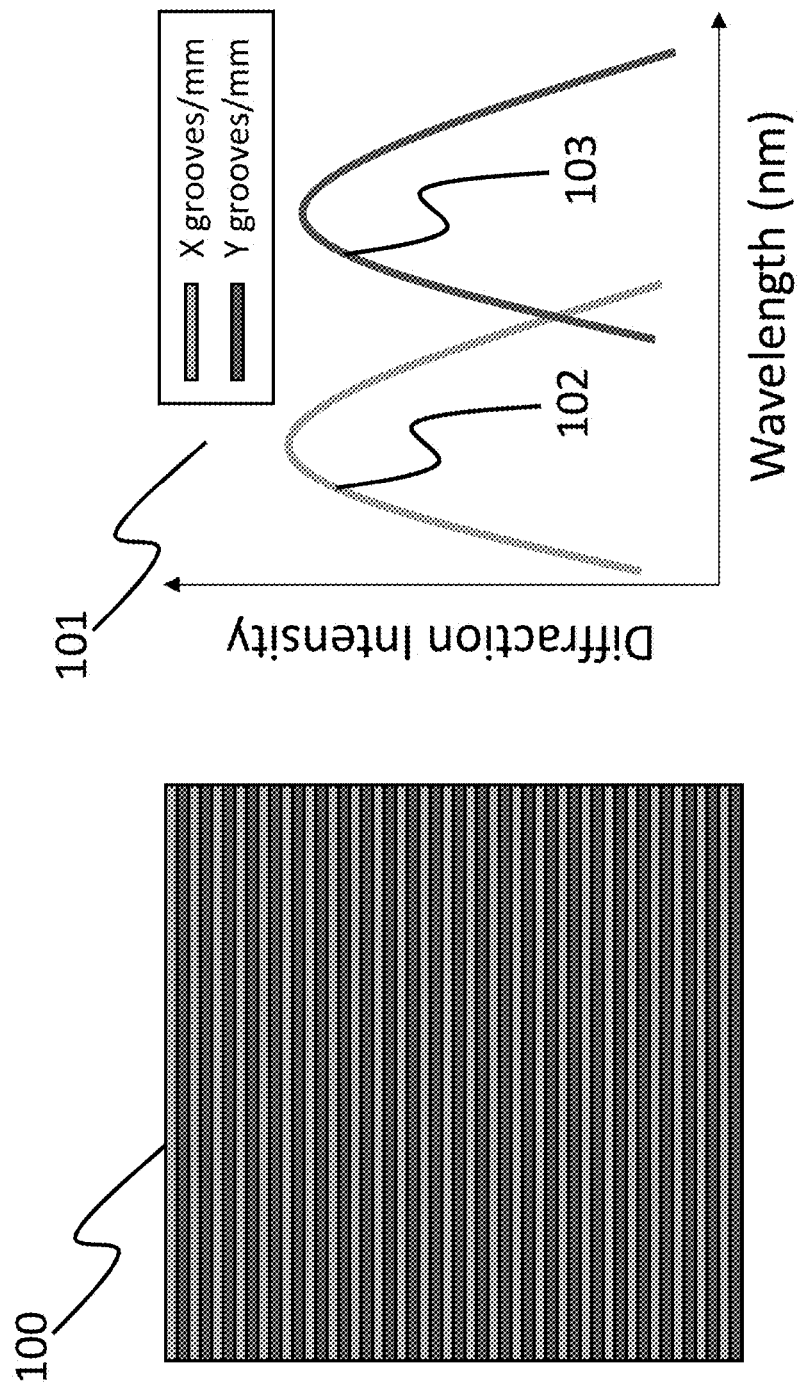
FIG. 1A shows a schematic of an interlaced grating in which each row corresponds to a specific diffraction pattern as illustrated by plots of diffraction intensity versus wavelength in FIG. 1B.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Referring now to various embodiments of the disclosure in more detail, in FIG. 1A is a representative interlaced grating (100) in which the light gray and dark gray bands represent different grating densities as a function of spatial location across the grating. Note that in this example embodiment, two alternating bands of different grating densities are shown. In general, the interlaced grating includes alternating bands of two or more bands of unique grating densities. FIG. 1B is a representative plot (101) that illustrates the corresponding light gray (102) and dark gray (103) spectroscopic diffraction intensities versus wavelength. For example, if the band (102) has a width of W1 and L1 grating lines in the band, then the band (102) has a grating density X=L1/W1, and the band (103) has a width of W2 and L2 grating lines in the band, then the band (103) has a grating density Y=L2/W2, where X≠Y.

The optical dispersive grating may be reflective or transmissive, and it may be fabricated by mechanical ruling, holography, or reactive ion etching of a binary mask.

Figure 2:
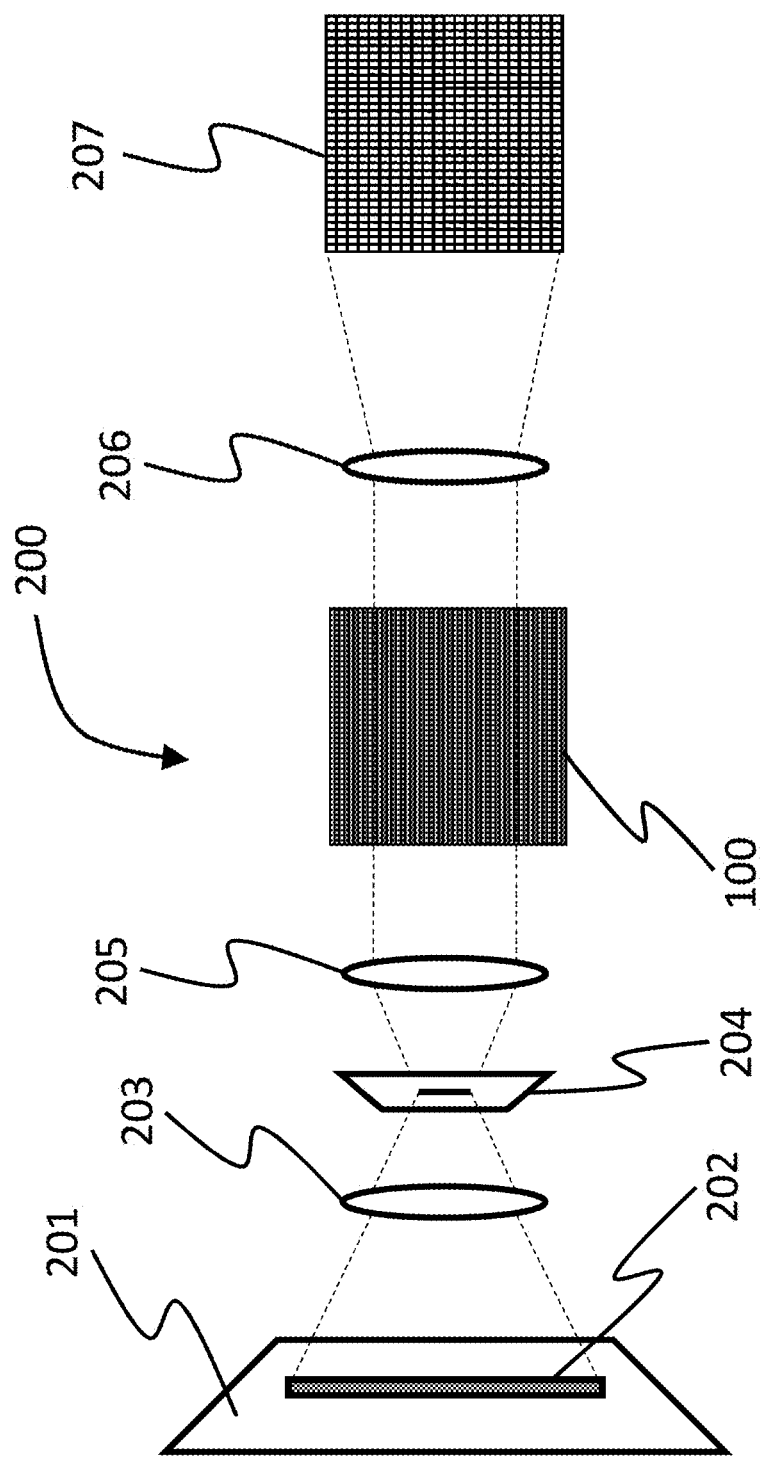
FIG. 2 is a schematic of a line-scan hyperspectral imaging system in which the unique diffraction patterns of an interlaced grating are aligned with the rows of a 2D detector (or camera).

Referring now to FIG. 2, in one embodiment, the line-scan hyperspectral imaging system (200) measures a target scene (201) in which an interrogated area (202) yields transmitted, reflected, or emitted light. The light is collected by a collection lens (203) and focused onto an optical slit (204) just prior to being collimated by a collimating lens (205). The collimated light is diffracted via a 2D pattern along the dimension of the slit by the interlaced grating (100) prior to being focused by a focusing lens (206) onto a 2D detector array or camera (207). In one embodiment, a processor is configured to execute an algorithm to extract and processor the data from the 2D detector array or camera.

Figure 3:
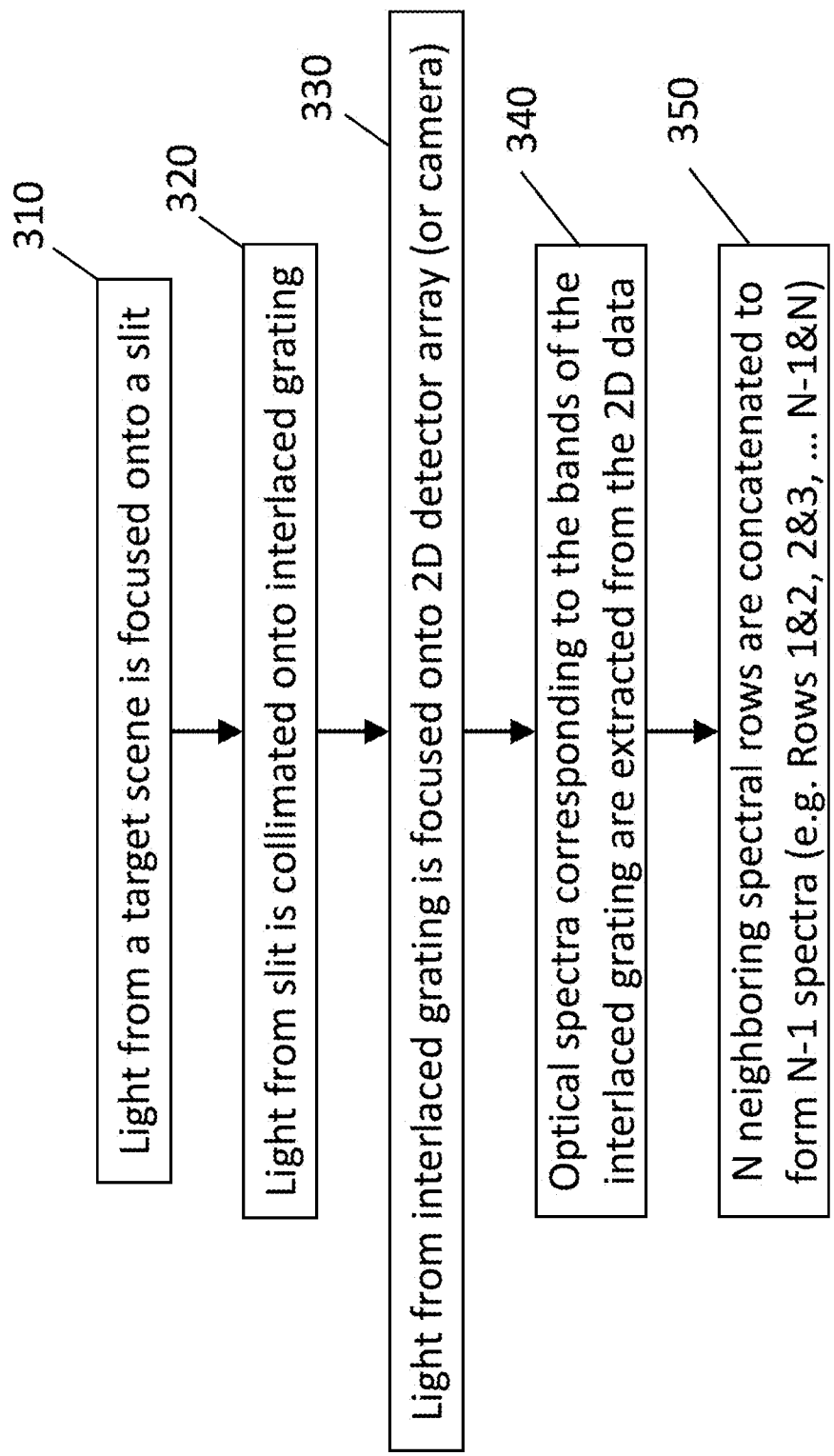
FIG. 3 is a process flow diagram for yielding a hyperspectral image from an interlaced grating system.

Referring now to FIG. 3, a process flow diagram of performing a hyperspectral imaging measurement with an interlaced grating is illustrated. Step 310: light from a target scene is focused onto a slit. Step 320: the light from the slit is collimated onto an interlaced grating. Step 330: the light from the interlaced grating is focused onto a 2D detector array or camera. Step 340: the optical spectra corresponding to the bands of the interlaced grating are extracted from the 2D data collected by the 2D detector array or camera. Step 350: N neighboring spectral rows are concatenated to form N−1 spectra (e.g., rows 1 & 2, 2 & 3, 3 & 4, . . . N−1 & N).

Figure 4:
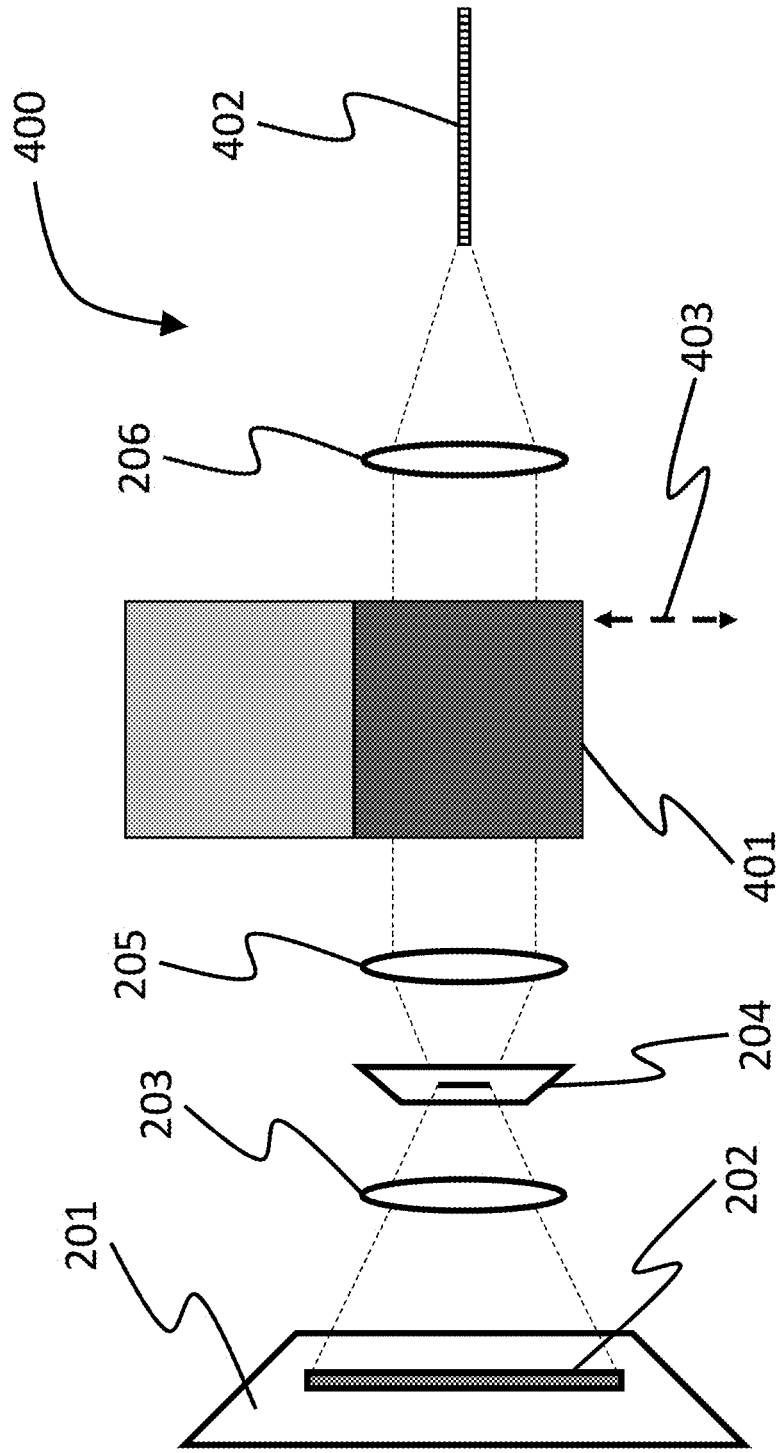
FIG. 4 is a schematic of a variable grating spectrometer system in which the grating may be translated across the incident beam to introduce unique diffraction patterns.

Referring now to FIG. 4, in one embodiment, the point detection spectrometer system (400) measures a target scene (201) in which an interrogated area (202) yields transmitted, reflected, or emitted light. The light is collected by a collection lens (203) and focused onto an optical slit (204) just prior to being collimated by a collimating lens (205). The collimated light is diffracted via variable grating (401) prior to being focused by a focusing lens (206) onto a linear detector array (402). The intended spatial portion of the grating exhibiting the desired diffraction grating density may be inserted into the optical path via a mechanical translation control (403).

Figure 5:
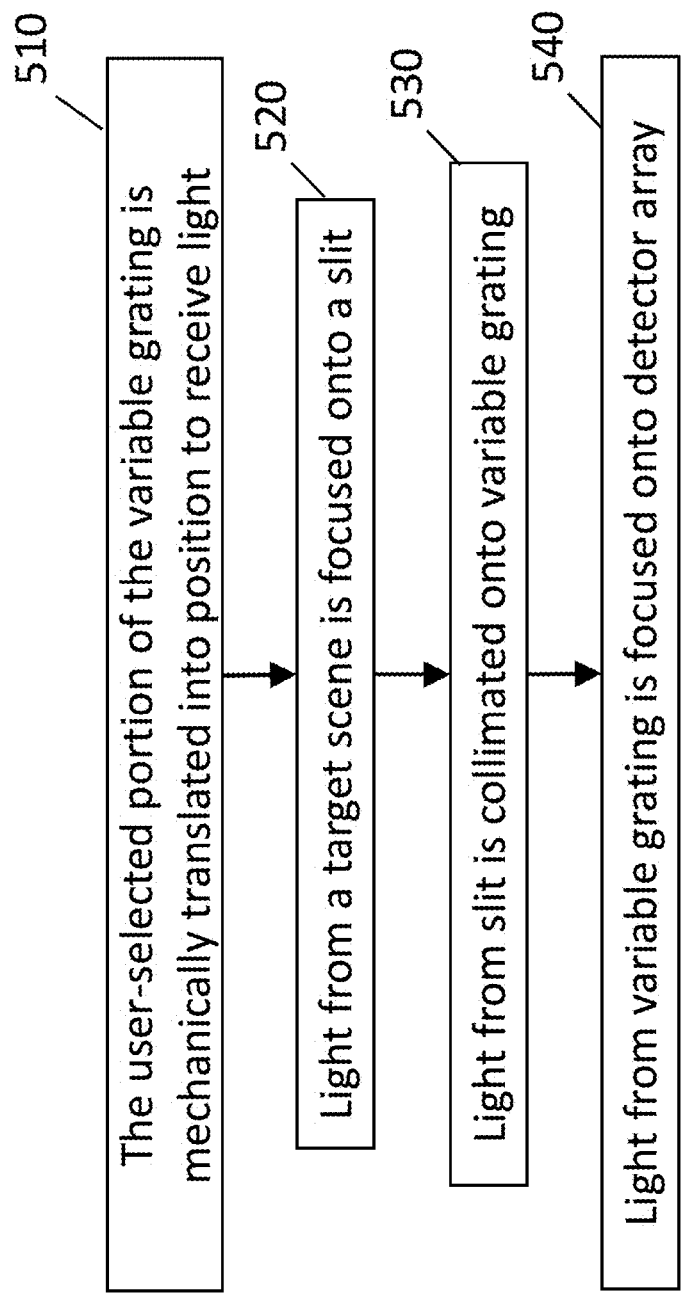
FIG. 5 is a process flow diagram for obtaining an optical spectrum from a variable grating system.

Referring now to FIG. 5, a process flow diagram of performing a spectrometer measurement with a variable grating is illustrated. Step 510: The user-selected portion of the variable grating is mechanically translated into position to receive light. Step 520: Light from a target scene is focused onto a slit. Step 530: The light from the slit is collimated onto a variable grating. Step 540: The light from the variable grating is focused onto a linear detector array. In one embodiment the variable grating includes two or more grating regions having unique grating densities.

Uses of the disclosed systems and processes include but are not limited to: spectroscopic detection and line-scan hyperspectral imaging.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A line-scan hyperspectral imaging system comprising:
a first lens;
a slit;
a collimating lens;
an interlaced optical grating;
a second lens; and
a 2-dimensional detector array;
wherein the first lens is configured to collect light from a scene and focus onto the slit, the collimating lens is configured to collimate the light from the slit onto the interlaced optical grating, and the second lens is configured to focus the light dispersed by the interlaced optical grating onto the 2-dimensional detector array;
wherein the interlaced optical grating comprises alternating bands of at least a first grating band and second grating band, and the at least first and second grating bands have unique grating densities;
wherein the system further comprises a processor configured to extract optical spectra data from the 2-dimensional detector array corresponding to the bands of the interlaced optical grating, and concatenate N neighboring spectral bands to form N−1 spectra.

2. A method of performing a hyperspectral imaging comprising:
focusing, by a first lens, light from a scene onto a slit;
collimating, by a collimating lens, light from the slit onto an interlaced grating;
focusing, by a second lens, light dispersed by the interlaced grating onto a 2-dimensional detector array;
wherein the interlaced grating comprises alternating bands of at least a first grating band and second grating band, and the at least first and second grating bands have unique grating densities;
wherein the method further comprises a extracting, from the 2-dimensional detector array by a processor, optical spectra data corresponding to the bands of the interlaced optical grating; and
concatenating, by the processor, N neighboring spectral bands of data to form N−1 spectra.

* * * * *